J. F. GASIOROWSKI.
MOLDING CAP MACHINE.
APPLICATION FILED JUNE 6, 1916.

1,235,460.

Patented July 31, 1917.

Inventor:
J. T. Gasiorowski

By N. M. Wilson
atty

UNITED STATES PATENT OFFICE.

JOHN T. GASIOROWSKI, OF EXETER BOROUGH, PENNSYLVANIA, ASSIGNOR OF ONE-THIRD TO GEORGE J. BRANN, OF EXETER BOROUGH, PENNSYLVANIA.

MOLDING-CAP MACHINE.

1,235,460.  Specification of Letters Patent.  Patented July 31, 1917.

Application filed June 6, 1916. Serial No. 102,034.

*To all whom it may concern:*

Be it known that I, JOHN T. GASIOROWSKI, a citizen of the United States, residing at Exeter Borough, in the county of Luzerne and State of Pennsylvania, have invented certain new and useful Improvements in Molding-Cap Machines, of which the following is a specification.

This invention relates to new and useful improvements in window cap making machines and more particularly to the manufacture of composition blocks in the form of molding caps for employment with window structures.

The present invention contemplates the provision of a sectional or knock-down mold adapted for the manufacture of building blocks of concrete cement or other similar material, such blocks being formed as molding cap stones for windows.

One object of the device is the provision of a mold having hinged end portions and provided with interchangeable bottom members adjustable in height whereby blocks may be formed having different forms of faces and of different cross sectional areas.

Another object is to provide a mold for plastic material having removable side portions and a bottom for forming the desired molding face, which bottom consists of longitudinally hinged portions allowing the ready removal of one side of the mold and a shifting of the adjacent side of the bottom for easily releasing the completed block.

With these general objects in view and others that will appear as the nature of the invention is better understood, the same consists in the novel combination and arrangement of parts hereinafter fully described, illustrated in the accompanying drawings and then claimed.

In the drawings forming a part of this application and in which like designating characters refer to corresponding parts throughout the several views:—

Figure 1:
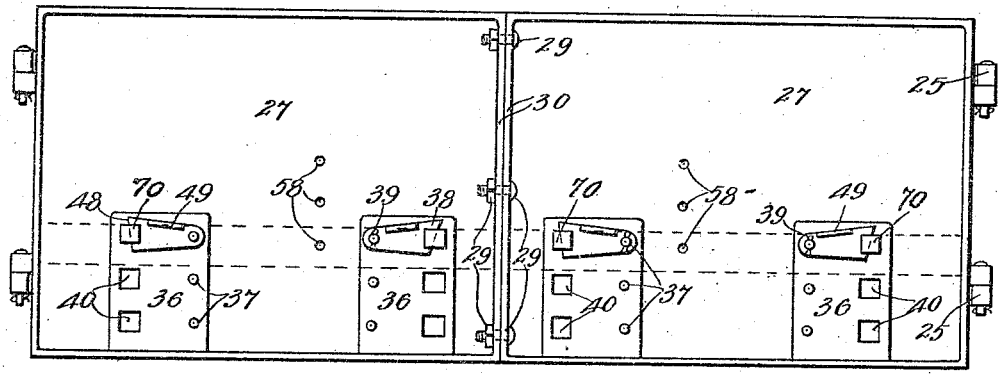
Figure 1 is an elevational view of one side of the machine.

It will be first understood that the present machine is in the nature of a box-form of mold for plastic materials such as cement, whereby a molding cap or top stone 20 of a window structure may be readily molded or formed therein. The machine broadly consists of opposite longitudinal side walls 22 and 23 herein referred to as the rear and front wall respectively and having similar end walls 24 swingingly attached by means of hinges 25 to the opposite ends of the rear wall 22 and provided with connecting latches 26 for detachable connection with the opposite ends of the front wall 23, whereby the said four walls are readily arranged in rectangular formation with the front wall 23 readily released and detached when found desirable.

Figure 2:
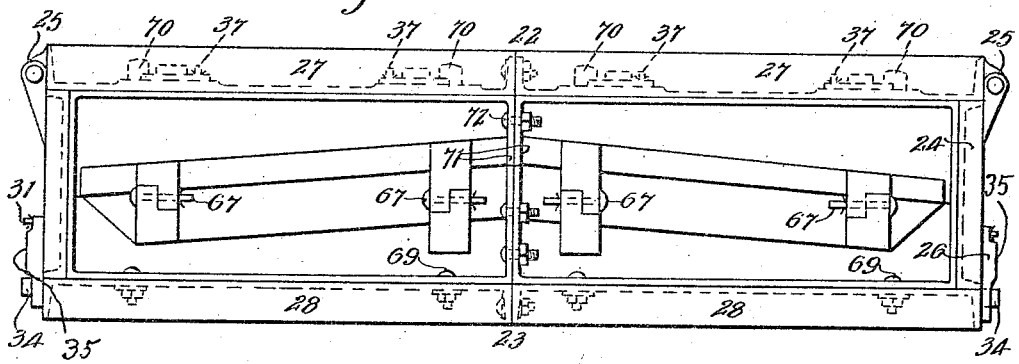
Fig. 2 is a bottom plan view thereof.

The side walls 22 and 23 are similarly formed of flanged rectangular plates 27 and 28 respectively, the same being normally secured together by means of removable bolts 29 arranged through the adjacent abutting inner flanges 30 of the said plates. The end walls 24 are formed of a similar single plate likewise having an outwardly extending marginal flange provided entirely around the same. The ends 24 are adapted to swing upon their hinges 25 inwardly between the opposite end portions of the walls 22 and 23 in perpendicular relation with respect to the said side walls, as best illustrated in Fig. 2 of the drawing. The latches 26 are pivotally mounted to the ends 24 by means of projecting pintles 31. The latches 26 are provided with notches adapted to hook over hook-shaped keepers 34 projecting longitudinally from the opposite ends of the side wall 23, the latches having finger holes 35 in the form of marginal flanges projecting therefrom. The plates 27 of the rear wall 22 are arranged with rectangular reinforces 36 positioned adjacent the lower sides thereof, two of the said reinforces being provided for each of the said plates and having a vertical row of pintles 37 projecting therefrom and adapted to removably pivot a catch 38 upon any desired pintle, retaining cotters 39 being provided for pintles 37. The reinforces 36 and the adjacent plate 27 are provided with three rectangular perforations 40 projecting therethrough, one of said perforations being provided for each of the pintles 37 and arranged substantially in horizontal alinement therewith. The plates 28 of the front wall of the machine are provided with perforations 41 in substantially the same horizontal planes as the three sets of perforations 40 of the plate 27, it being understood that the perforations 40 and 41 are adapted to coöperate in retaining the desired form of bottom member of the machine at the required elevation for forming a block of the desired size and configuration.

When desired to form a molding cap block, such as 20, in the present machine, a bottom 64 is secured at the desired height between the front and rear walls. The said bottom 64 consists of two parts 65 and 66 connected together by hinges 67 and having a channeled mold depression 68 upon their inner sides when operatively positioned, such depression being of a form complemental with respect to the desired configuration to be provided upon the cap block.

Figure 4:
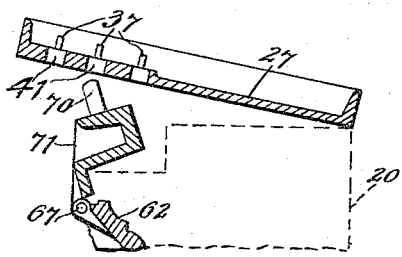
Fig. 4 is a similar view showing one side and the bottom of the machine positioned for releasing the completely formed block, the latter being illustrated in dotted lines.
Figure 3:
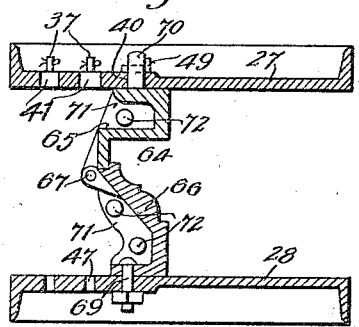
Fig. 3 is a transverse sectional view of the same.
Figure 5:
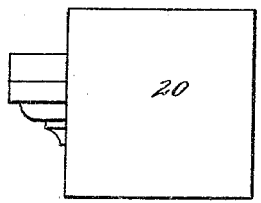
Fig. 5 is an end view of a molding cap block formed in the machine illustrated in Fig. 2 of the drawing.

Bolts 69 are secured through the perforations 41 of the plates 28 and through the adjacent flanges of the bottom section 66 while the bottom section 65 is provided with outwardly extending posts 70 adapted for engagement with the swinging beveled ends 48 of the catches 38, it being noted that projections 59 are formed on the catches 38 to facilitate the manipulation thereof. The bottom 64 has each portion thereof provided with a marginal flange, the adjacent inner flanges 71 of which are detachably connected together by means of bolts 72. With the machine arranged as illustrated, the cement will be filled in and properly tamped and when the block is completed, the rear wall 22 and the side walls 24 may be swung away from the block and the section 65 of the bottom 64 being released from the plates 27, the portion 65 may be moved upon its hinges 67 as best illustrated in Fig. 4 of the drawings for releasing the block 20 for ready removal.

It will be thus seen that a serviceable device is provided whereby molding caps for window structures may be easily formed of any desirable plastic material, the machine being composed of but few parts possessing great strength and durability.

While the form of the invention herein shown and described is what is believed to be the preferable embodiment thereof, it is nevertheless to be understood that minor changes may be made in the form, proportion and details of construction without departing from the spirit and scope of the invention as hereinafter claimed.

What I claim as new is:—

1. A device of the class described comprising a rectangular mold having opposite side walls formed of separable sections and end walls hinged to one of the said side walls and detachably connected to the other side wall, a bottom member removably and adjustably positioned within the said frame provided with a molding depression therein and arranged in two sections hingedly connected together.

2. A block machine comprising front and rear walls formed of two separable sections and having end walls hinged to one of the said side walls and detachably connected to the other side wall, the said side walls having perforations therethrough in substantial alinement with each other, a bottom member formed in two sections hingedly connected together and having a molding depression in its upper face and attaching means carried by the said bottom sections adapted for reception through the said perforations when the device is operatively arranged.

3. A molding cap and sill machine comprising a rectangular mold having a two-part flanged rear wall and a similar front wall, flanged end walls hingedly connected to the opposite ends of the said rear wall, latch connections between the said end walls and the opposite ends of the said front wall, reinforces carried by the said rear wall and rectangular perforations arranged through the said wall and reinforces, projecting pintles carried by the said reinforces adjacent the said perforations, removable latches carried by the said pintles, the free ends of the said latches having paths of movement transversely of the said perforations, a block face forming bottom member for the said mold and supporting members carried by the said bottom member and arranged through the said perforations in locked engagement with the said latches when the device is set up for use.

4. A molding cap and sill machine comprising a rectangular mold having one removable wall and two hinged walls and provided with a two-part hinged molding bottom adjustably and detachably arranged within the mold whereby a side of the latter is removed and the sections of the said bottom relatively shifted during the removal of the block formed therein.

5. A molding cap and sill machine comprising a mold of rectangular form having a separable side wall, the side walls of the mold having a series of perforations at different heights arranged in alinement through the opposite walls thereof and a block face forming bottom arranged within the said mold and provided with mounting members positioned through the said perforations whereby a block of the desired height and face formation may be formed thereby.

6. A molding cap and sill machine comprising a rectangular mold, and a hinged sectional molding bottom removably arranged within the wall, the bottom being movable on its hinged connection during removal of the block from the machine.

In testimony whereof I affix my signature.

JOHN T. GASIOROWSKI.

Copies of this patent may be obtained for five cents each, by addressing the "Commissioner of Patents, Washington, D. C."